Sept. 25, 1951 G. E. BJORKLUND 2,568,708
DENTAL DRILL AND HANDPIECE FOR SAME
Filed Aug. 6, 1947
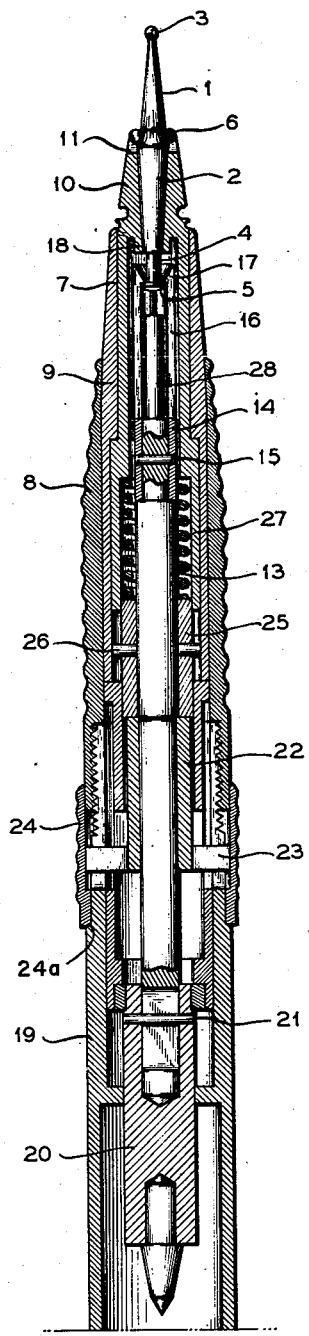
INVENTOR.
GUSTAF ERIK BJORKLUND
BY
ATTORNEY Patented Sept. 25, 1951

2,568,708

UNITED STATES PATENT OFFICE 2,568,708

DENTAL DRILL AND HANDPIECE FOR SAME

Gustaf Erik Björklund, Stockholm, Sweden

Application August 6, 1947, Serial No. 766,595
In Sweden August 12, 1946

3 Claims. (Cl. 279—51)

This invention relates to dental drills and handpieces therefor and to means for securing such a drill in operative position within the handpiece. Specifically the invention relates to drills having conical bearing surfaces by means of which they are retained in a fitting or chuck suitably journalled within the handpiece.

Devices of this character manufactured heretofore have relied upon frictional engagement between the conical portion of the drill and the taper of the chuck bearing to retain the drill in working position. Such structures have proven unsatisfactory because of the limitations in taper occasioned by the comparatively slight dimension of the drill and also because the drills were too fragile to withstand the repeated blows necessary for loosening.

It is an object of the present invention to provide mechanical means within the handpiece designed to cooperate with the usual tapered bearing to provide axially directed force for securing a drill in position. By means of an arrangement of this character the taper of the drill and bearing within which it seats may be increased to an extent where no mechanical blow is required for the loosening and removal thereof.

If desired the handpiece illustrated and described herein may be designed to accommodate the novel drill described and claimed in applicant's copending application, Serial No. 766,594 filed August 6, 1947.

Another novel handpiece drill assembly has been disclosed in applicant's copending application, Serial No. 766,596 filed August 6, 1947, now Patent Number 2,507,587 issued May 16, 1950, also designed to accommodate this novel drill as well as other commercially available and comparable drills.

Further objects and advantages of the invention will be apparent from the following description taken in conjunction with the accompanying drawing, wherein:

There is illustrated in the single figure of the accompanying drawing a longitudinal sectional view through a handpiece constructed in accordance with the present invention and having a drill positioned therein.

As shown in the drawing, the drill 1 includes the usual abrading or cutting extremity 3 and a conical or tapered shank portion 2 adapted to be seated within a complementary bearing or socket in a chuck 10. An annular groove 4 is provided at the end of the tapered shank remote from the cutting extremity forming a flange or shoulder 5 by means of which the drill is retained in the chuck as will be hereinafter more fully described.

Diametrically opposed projections or lugs 6 are provided, substantially adjacent to the greatest diameter of the drill, adapted to engage within opposed slots 11 formed at the outer extremity of the chuck 10. Free rotation of the drill within the chuck is thus prevented.

The handpiece 8 of this invention includes a convenient finger engaging portion and is provided with a tubular bearing member or sleeve 9 which extends therebeyond and the chuck 10 includes a rotatable sleeve-like spindle 7 which is journalled within this bearing member. To prevent chips or other abrasive matter from entering the handpiece the chuck is grooved to provide an anular flange 12 closely adjacent to the point where the rotatable spindle 7 enters the bearing sleeve 9 of the handpiece. This structure is of particular advantage during such times as the drill is used in a semi-vertical position where chips or other matter might fall down or tend to cling to the outer surface of the chuck, such matter being discharged by centrifugal force in a direction tangential to the circumference of the flange 12 and prevented from working into the mechanism of the handpiece thus obviating any necessity for frequent disassembly and cleaning.

In order to securely retain the conical shank 2 of the drill within the tapered socket of the chuck 10 which forms part of the rotatable spindle, the handpiece 8 is provided with an axially reciprocable sleeve 14 terminating in a plurality of spring fingers 16 having substantially hook shaped extremities 17 adapted to engage within the annular groove 4 behind the flange 5 on the drill 1. The sleeve 14 is fixedly secured as by a pin or the like 15 upon an axially displaceable drive shaft 13 suitably mounted within the handpiece for longitudinal reciprocation.

From the foregoing it will be readily understood that when the conical shank 2 of the drill is seated in the chuck 10, the sleeve 14 may be moved axially in a direction away from the drill, thus drawing the drill 1 tightly into the chuck bearing and maintaining engagement of the lugs 6 within the slots 11. When it is desired to remove the drill from the chuck it is only necessary to move the sleeve 14 toward the chuck 10, at which time the hooked extremities or claws 17 of the fingers 16 will engage with an annular cam surface 18 provided on the inner extremity of the chuck, within the spindle 7, and will be spread apart radially, thus releasing the flange 5 and permitting ready withdrawal of the drill from the chuck.

The handpiece 8 is threadedly or otherwise secured to a tubular casing 19 and the shaft 13 extends into this casing and carries a coupling member 20 adapted for engagement with the usual driving mechanism (not shown). Preferably this coupling member surrounds the extremity of the shaft, a pin or the like 21 being provided to insure operative engagement between shaft and coupling.

Any desired means may be provided for axially displacing the shaft 13 within the handpiece 8, a preferred embodiment thereof comprising opposed projections or arms 23 carried by a sleeve 22 maintained upon the reduced lower portion of the shaft 13 and within which this shaft is free to rotate. The arms 23 project into relatively short longitudinal slots in the casing 19 adapted to slide within the ring-like member 24 reciprocally mounted on casing 19 and adapted to be pushed forward by engagement with the shoulder 24a on member 24.

Immediately above the sleeve 22 a bushing or the like 25 surrounds the shaft 13 and is secured thereto by any suitable means such as a pin 26. The spindle 7 is provided with a slightly enlarged axial bore adapted to receive the extremity of the bushing 25 and a coil spring 27 is positioned within this bore in surrounding relationship to the shaft 13. Normally this coil spring urges the entire shaft assembly including the gripping fingers 16, the sleeve 22, and ring 24, in a direction away from the chuck 10. Rotative movement is imparted to the spindle 7 through the pin 26, the extremities of which project into opposed longitudinal slots appropriately positioned in the inner extremity of the spindle.

It will thus be apparent that an axial force is exerted upon the drill 1 through the spring 27, tending to seat the drill more securely within the tapered bearing in the chuck. Advancement of the ring 24 will move the sleeve 22, bushing 25 and shaft 13, compressing the spring 27 and forcing the claws 17 against the cam surface 18. The hooked extremities or claws will thus be spread apart, releasing the flange 5 and freeing the drill, which may then be pushed or ejected from the socket, a reduced upper extremity 28 on the shaft 13 being provided to accomplish this result. The ring 24, upon release, will be returned to normal position by the spring 27.

When it is desired to insert another drill, the conical portion thereof is inserted within the tapered bearing of the chuck 10. The ring 24 is then advanced, carrying the shaft 13 forward so that the claws 17 of the fingers 16 ride over the flange 5 on the adjacent extremity of the drill and drop into the annular groove 4.

There has thus been provided a drill and straight handpiece assembly so constructed as to efficiently receive and rotate relatively short drills of a character normally employed in an angular handpiece or one which carries a drill disposed in angular relationship. The extension of the spindle beyond the finger engaging portion of the handpiece enables the operator to obtain maximum reach when the device is in use and permits ready removal and insertion of drills.

It will be obvious to those skilled in the art that various changes may be made in the invention without departing from the spirit and scope thereof and therefore the invention is not limited by that which is illustrated in the drawing and described in the specification but only as indicated in the appended claims.

What I claim is:

1. A handpiece for a dental drill including a spindle rotatably mounted therein and extending substantially therebeyond, a tapered drill receiving socket in said spindle and a diametrically disposed slot in the outer end thereof for interengagement with projecting lugs upon a dental drill, an axially reciprocable sleeve within said spindle, hooked fingers on said sleeve adapted to engage in an annular groove on the inner end of the drill whereby said drill may be drawn into and retained in said socket, a second axially displaceable sleeve within said handpiece, a drive shaft journalled within said second sleeve and displaceable therewith, said drive shaft extending into said first mentioned sleeve and being fixedly secured thereto, a coil spring surrounding the shaft and normally urging said shaft and second sleeve away from the inner extremity of the drill, reciprocable means carried upon the handpiece exteriorly thereof adapted to displace said second sleeve and shaft to release the hooked fingers, a reduced upper extremity upon said shaft adapted to eject the drill when the hooked fingers are disengaged therefrom, and a driving connection between said shaft and spindle.

2. A handpiece for a dental drill including a spindle rotatably mounted therein and provided with a tapered chuck adapted to receive the conical shank of a drill, an axially displaceable sleeve reciprocable within said handpiece, a drive shaft journalled within said sleeve and axially displaceable therewith, hooked fingers on said shaft adapted to engage the inner extremity of the drill whereby said drill may be drawn into and retained in said chuck, a coil spring surrounding the shaft and normally urging said shaft and sleeve away from the inner extremity of the drill, reciprocable means carried upon the handpiece exteriorly thereof adapted to displace said sleeve and said shaft to release the hooked fingers and permit removal of the drill, and a driving connection between said shaft and spindle.

3. A handpiece for a dental drill including a spindle rotatably mounted therein and provided with a tapered chuck adapted to receive the conical shank of a drill, an axially displaceable drive shaft mounted within said handpiece, hooked fingers on said shaft adapted to engage the inner extremity of said drill, and resilient means within said handpiece adapted to urge said shaft away from said drill to securely retain the drill within said chuck.

GUSTAF ERIK BJÖRKLUND.

REFERENCES CITED

The following references are of record in the file of this patent:

UNITED STATES PATENTS

| Number | Name | Date |
|---|---|---|
| 213,167 | Brown | Mar. 11, 1879 |
| 583,625 | Lusby | June 1, 1897 |
| 1,596,139 | Andresen | Aug. 17, 1926 |